United States Patent [19]
Griffiths et al.

[11] 4,361,898
[45] Nov. 30, 1982

[54] DIGITAL SYNCHRONIZING SYSTEM

[75] Inventors: Frank A. Griffiths, Oxhey; Joseph R. Hankinson, Watford, both of England

[73] Assignee: Polygram GmbH, Hamburg, Fed. Rep. of Germany

[21] Appl. No.: 223,164

[22] Filed: Jan. 7, 1981

[30] Foreign Application Priority Data

Jan. 9, 1980 [GB] United Kingdom ............... 8000710

[51] Int. Cl.³ .............................................. H04L 7/08
[52] U.S. Cl. ..................................... 375/114; 371/42
[58] Field of Search ............... 371/42, 47; 340/825.14; 360/40, 51, 70; 370/100, 106; 375/106, 114, 116, 118, 119; 328/72, 74, 75

[56] References Cited

U.S. PATENT DOCUMENTS

| | | | |
|---|---|---|---|
| 3,961,311 | 6/1976 | Pavoni et al. | 371/42 |
| 4,008,488 | 2/1977 | Osborne | 360/51 |
| 4,271,520 | 6/1981 | Coombes et al. | 371/42 |

*Primary Examiner*—Benedict V. Safourek
*Attorney, Agent, or Firm*—Hill, Van Santen, Steadman, Chiara & Simpson

[57] ABSTRACT

A synchronizing system for the control of the transmission of digital information which is composed of blocks separated by gaps and for which synchronization requires the production of a reference pulse. Each field of information includes a series of spaced coded synchronizing control words each of which is a coded representation of the separation between the word and the position required for the synchronizing signal. The synchronizer (FIG. 3) includes a decoder composed of read-only memories (IC2, IC3) which can set a counter (IC4, IC5 and IC6) in accordance with the separation. The decoded synchronizing control signal is compared by comparator IC8 and a read-only memory IC7 with the instantaneous contents of the counter and the counter is adjusted only if parity is not detected. If parity is detected and continues to be detected for each synchronizing control word, the counter counts towards a datum whereupon the synchronizing signal is produced. The occasions of parity are counted by another counter which causes the production of an inhibiting signal for the output synchronizing signal unless a predetermined number of occasions of parity are counted.

5 Claims, 3 Drawing Figures

DIGITAL SYNCHRONIZING SYSTEM

BACKGROUND OF THE INVENTION

This invention relates to the control of the transmission of digital information which is composed of data blocks separated by gaps.

When digital information is recorded in blocks a synchronising system is normally used, on playback of the information, to establish the identity of the data words within the blocks of data. For example, in a recorder of audio information in digital form, the data bits within a block are, before they are recorded on the magnetic tape, usually rearranged in time sequence, in order to facilitate the detection and correction of error. During playback, the data must be rearranged in order to recover the data words in their original forms and order. The rearrangement is normally performed with the aid of a buffer memory. The process of writing information into the buffer memory must be exactly synchronised else otherwise the data may be written incorrectly in the various locations of the memory and the information will not be reassembled in its proper order. Other systems for the transmission of data have, for similar reasons, a similar requirement for the correct synchronisation of the data.

It has been proposed to provide, at the beginning of each data block, a control word so that the detection of this control word may provide a synchronising signal. However, many systems and machines, particularly tape recorders, for the recording or playback of digital information suffer from "drop-outs", that is to say temporary losses of information, owing to, for example, imperfections in the tape or other storage medium. The loss of all or part of a synchronising control word cannot be tolerated in any system which requires active synchronisation.

SUMMARY OF THE INVENTION

The present invention, which will be described in detail hereinafter, is intended for the control of transmission of digital information which is composed of blocks separated by gaps and for which synchronisation requires the production of a signal denoting a datum position in each block of information. Such a system might be a tape recorder arranged for the recording of audio information in digital form. Owing to mechanical and other variations in the performance of the tape recorder, the gaps between blocks of information may not be precisely known or predictable. In a system according to a preferred form of the present invention, each block includes a series of spaced digital words, each of which is a coded representation of a distance between the word and the position of the said datum. Each such word is decoded in its turn. A clock controlled counter is set in response to at least one of the decoded words and is disposed to count towards a datum corresponding to the aforementioned reference. Each decoded word is compared for equality with the contents of the counter, the counter is adjusted in response to a decoded word if absence of equality is detected, the occasions of equality are counted and the said signal is produced when the counter reaches the aforementioned datum provided that at least a predetermined number of occasions of equality have been counted.

DESCRIPTION OF THE PREFERRED EMBODIMENTS

Figure 1:
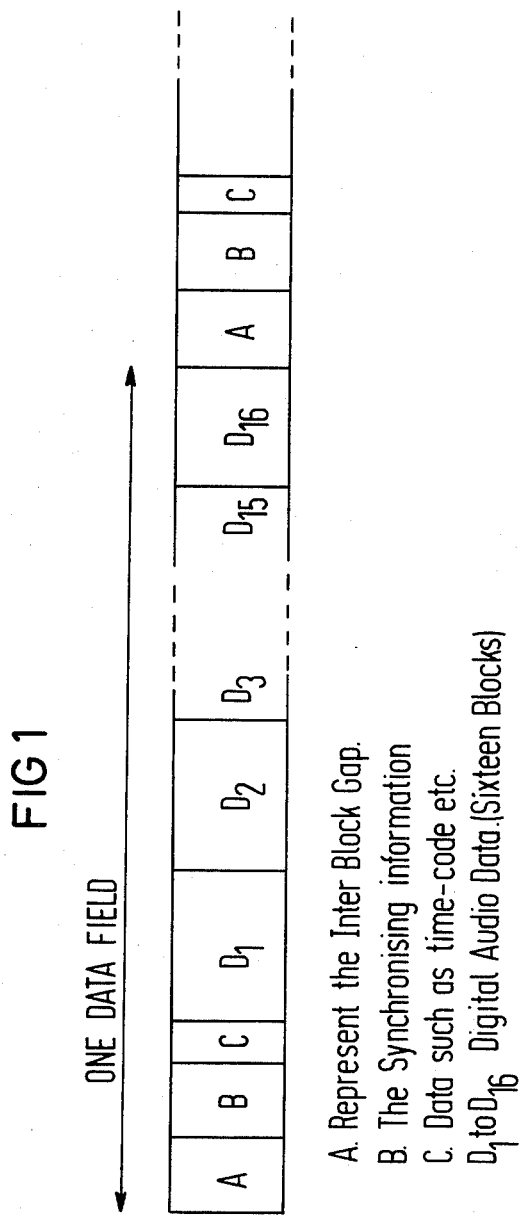
FIG. 1 illustrates a preferred format for information controlled according to the present invention.

One possible format for information which may be transmitted and controlled with the aid of the present invention is set out in FIG. 1, which illustrates one data block or field which is preceded by an interblock A and comprises parts B, C and D1 to D16, of which B represents synchronising information, C represents data such as time coding, of no particular relevance to the present invention, and D1 to D16 are sub-blocks of, for example, digital audio information. Such a format is based on the format of a television picture signal and the time of each part of the block may be described in terms of lines. A complete block may have a period of 20 mini seconds and contain, for example, three hundred and thirteen lines. A clock signal may be recorded in the interblock gap, which may have a duration of twenty lines and which provides a period of time during which the recording machine may be switched from one source of input signal to another for the purpose of editing. Moreover, the format permits the use of a helical scanning recorder, in which a small part of the interblock gap is normally lost during the interval between adjacent scans. The decoder used for recovering the information may include a clock oscillator which is phase locked to the clock signal made available during the gaps between blocks.

The aforementioned format is not the only one which might be used but it is to be understood that the present invention may be used in other systems in which each data block, which may comprise a multiplicity of sub-blocks, includes synchronising information at the start of each block, normally immediately after an interblock gap. The system is preferably self-clocked as already mentioned.

The synchronising information B occupies the first three "lines" of the data field or block and, as will be described, used to set the phase of a slave generator which generates synchronising signals for the control of the decoding of information in the remainder of the data field.

Figure 2:
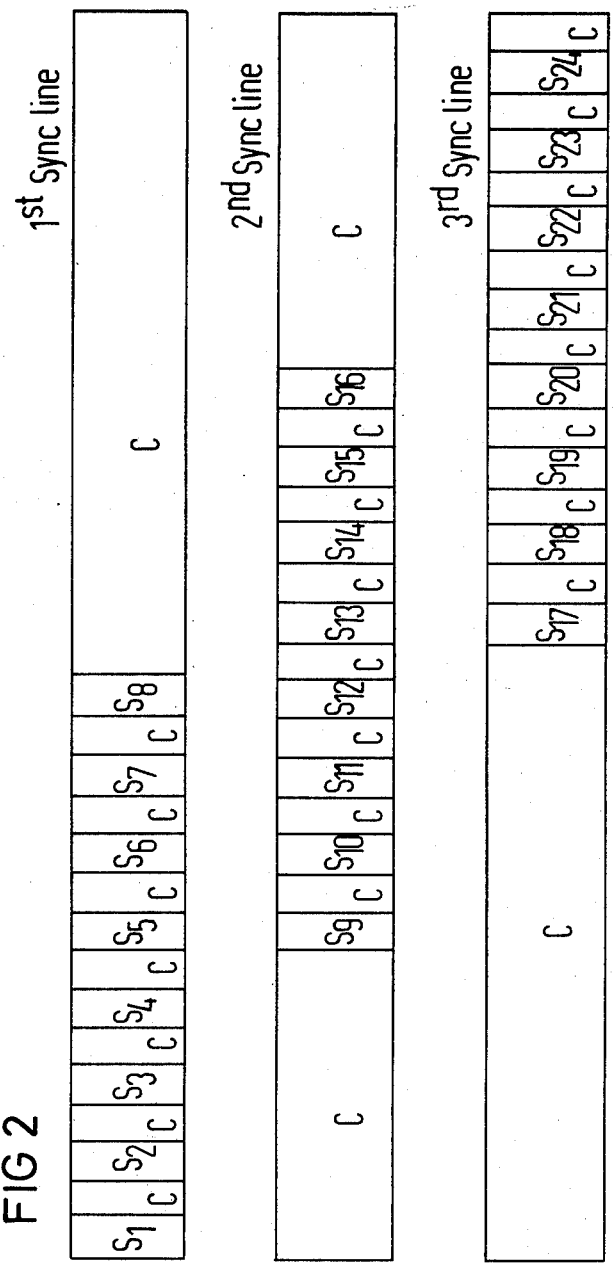
FIG. 2 illustrates part of the format in greater detail.

One possible format for the synchronising information is illustrated in FIG. 2. A series of words, each composed of, in this example, eight bits is placed at the beginning of the first "line", at the center of the second "line" and at the end of the third "line". There are therefore in this example twentyfour coded synchronising words. The remainder of each line is occupied by clock signal, namely the continuous series of bits 101010 .... Such a clock signal occpuies each 8-bit space between the synchronising words. Each synchronising word is unique and is preferably chosen so that if it were shifted leftwards or rightwards together with adjacent bits, it would not form any other of the set of synchronising words. It so happens that the number of possible 8-bit words is restricted and for this particular format of information it is not possible to fill all three lines with 8-bit words disposed alternately with 8-bit intervals of clock signal.

Each synchronising word defines, in this format indirectly, the distance, expressed as a number of bits, between the word and a synchronising reference point, which is chosen to be the end of the third line. The association of each synchronising word with the respective distance is by means of another respective word which can be obtained from the synchronising word with the aid of a read only memory that is accessed by the synchronising word.

Figure 3:
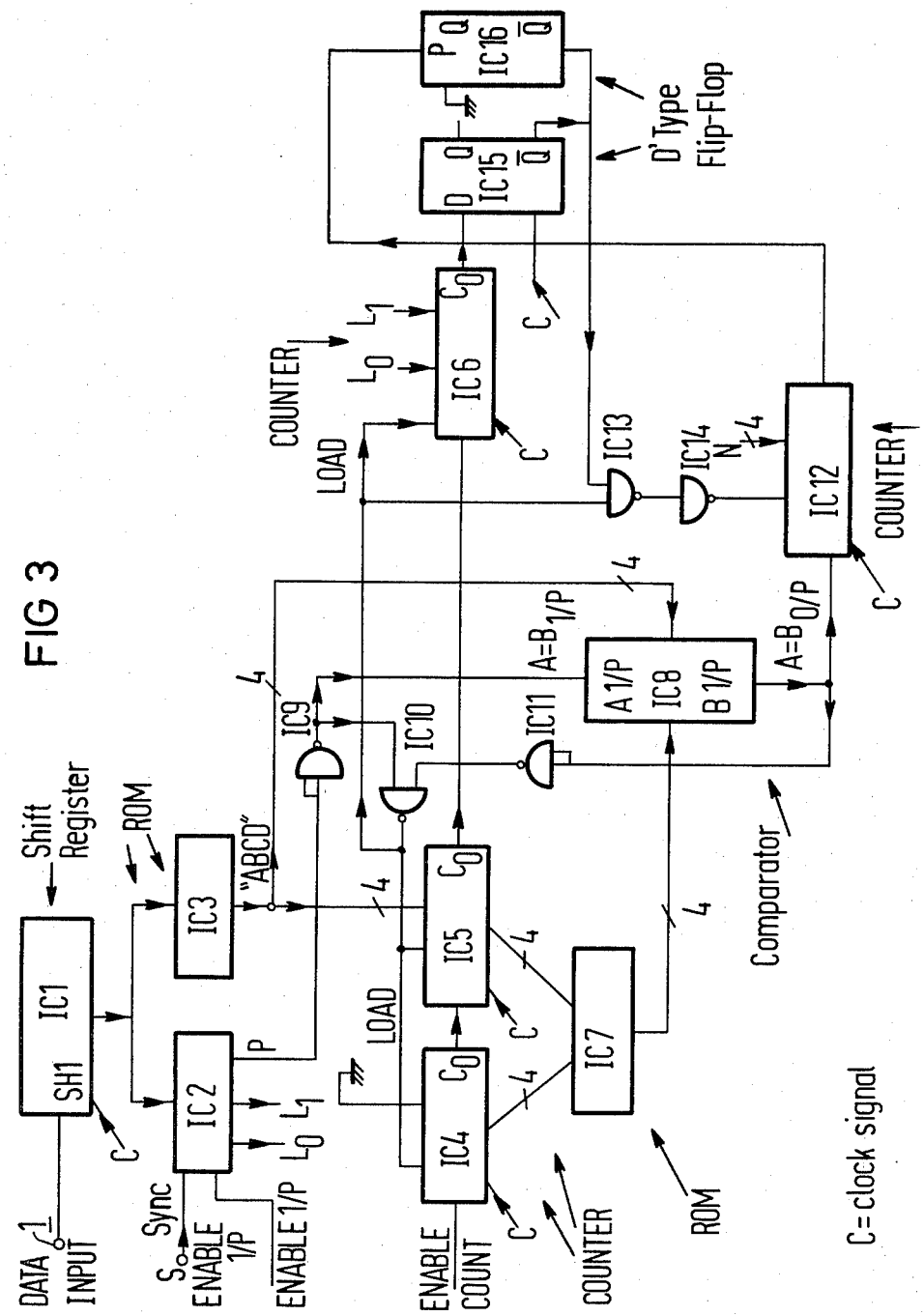
FIG. 3 is a schematic diagram of the relevant part of a synchronising system arranged according to the present invention.

The process of synchronisation will now be described with reference to the system illustrated in FIG. 3.

In the illustrated system, data received at an input terminal 1 enters a clocked shift register IC1 and presents each 8-bit word in turn to two read-only memories IC2 and IC3. These read-only-memories record the data and are programmed to recognise the synchronising words. When a synchronising word is detected the read-only memories provide signals $L_0$ $L_1$, P and "A B C D" when a sync word is detected. The signals $L_0$ and $L_1$ are fed to the final section of a clocked counter composed of stages IC4, IC5 and IC6. The signals $L_0$ and $L_1$, together with A B C D determine the time for which the counter must count before the end of the third line of synchronising words is reached. The pulse P is produced each time a synchronising word is recognised and, on the first occasion of recognition of a synchronising word the counter is loaded with the word A B C D, the counter being enabled by the gates IC9 and IC10.

The state of the counter as represented by the stages IC4 and IC5 is decoded by a read-only memory IC7; if the state of the counter exactly corresponds to the synchronising word of which the decoding yielded the word ABCD, the read-only memory provides the same word ABCD (whatever it may be).

The pulse P also causes the loading of a counter IC12 with a predetermined number N, which determines a minimum number of correct synchronising words which must be recognised before the output synchronising signal may be produced.

When a second synchronising word is recognised, a comparator IC8 checks for equality between the corresponding output word ABCD and the content of the counter, as represented by the output of the read-only memory IC7. If the transmission of data is properly syncrhonised, the production of synchronising words will be in step with the progression of the counter and there will be equality between the output of the read-only memory IC7 and the output of the read-only memory IC3. If the comparator detects such equality, then the pulse which would appear at the output of the gate IC10 to cause loading of the counter with the newly recognized synchronising word is inhibited and the second counter IC12 increments by unity. A similar check is made for each recognized synchronising word until the second counter IC12 has counted a predetermined number, for example fifteen, whereupon it provides an enabling signal to the second of a tandem pair of "D" bistables IC15 and IC16.

If however equality is not detected, the counter IC6 is adjusted to conform to the output of the read-only memory IC3 by the loading of the output of that memory into the counter.

The counter IC6 is arranged to reach its datum at the end of the third line whereupon this counter clears the bistable IC16 via the bistable IC15, the leading edge of the cue output of the bistable IC16 being the required synchronising signal.

When the counter IC12 has counted the minimum required number of recognized synchronising words, the slave pulse generator 17 cuts off an enabling signal fed to the read-only memory IC2 so that no pulses P are generated. This read-only memory is inhibited during the remaining part of the data field. Moreover, the enabling pulse may be used to permit detection of synchronising words only near the time at which they are expected. Such enabling takes into account variations in timing caused by editing and mechanical disturbances of the tape transport.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for the control of transmission of digital information which is composed of blocks separated by gaps and for which synchronization requires the production of a signal denoting a reference time for each block, in which system each block includes a series of spaced digital words each of which is a coded representation of the interval between the word and the position of said reference, comprising the steps of: decoding each such word in its turn; setting a clock controlled counter in response to at least one of the decoded words; providing the counter to count towards a datum corresponding to the reference time; comparing each word for equality with the contents of the counter; adjusting the counter in response to the decoded word if absence of equality and producing the said signal when the counter reaches the datum, provided that at least a predetermined number of occasions of equality have been counted.

2. A method according to claim 1 including the step of providing the information with an internal clock signal which controls the timing of the decoding of the words and the operation of the counter.

3. A method according to claim 1 in which the decoding of the words is inhibited once the predetermined number of occasions of equality have been counted when the signal is produced denoting the reference time as the counter reaches the datum.

4. A synchronizer for the development of a synchronizing signal for a block of information which includes of series of spaced synchronizing control words each of which is a coded representation of an interval between the respective word and a reference position within the block, the synchronizer comprising: a clock controlled counter means which counts towards a datum;

means responsive to the attainment of the said datum to produce the synchronizing signal;

a decoder means which responds to the synchronizing control words in accordance with a respective separation of which the decoded synchronizing control word is a representation; a comparator means which compares a decoded synchronizing control word with a concurrent content of the counter means to ascertain the existence of equality;

means effective on the discover of equality to inhibit the setting of the counter means by the decoder means and to permit such resetting in the absence of equality;

means for counting occasions of equality; and means for inhibiting production of the synchronizing signal unless a predetermined number of occasions of equality have been counted.

5. A synchroniser according to claim 4, including a slave generator means which controls decoding of information in the block and in which a phase of the slave generator is set by the synchronising signal.

* * * * *